3,666,486
METHOD FOR INCORPORATING BREAD IMPROVERS IN CONTINUOUS BREADMAKING
William W. Hodgson, West Chester, Pa., and David J. Ash, Independence, Mo., assignors to International Telephone & Telegraph Corp., New York, N.Y.
No Drawing. Filed July 25, 1969, Ser. No. 845,059
Int. Cl. A21d 2/04, 2/16
U.S. Cl. 99—91                                   7 Claims

ABSTRACT OF THE DISCLOSURE

Yeast leavened baked products are prepared by continuous processes. In these continuous processes, coated bread improvers are incorporated into the initial yeast brew step of the processes. The bread improver component remains intact within a solid, insulating water insoluble coating until it is thermally released in the final high speed mixing step to act in promoting the development of the final dough. The coating material is an edible, water insoluble triglyceride fat having a melting point of at least 90° F.

---

This invention relates to new and improved compositions for use in continuous breadmaking processes and to new and improved continuous processes for producing bread therewith. More particularly, it relates to new and improved coated bread improvers for use in continuous breadmaking processes and to the processes employing these coated bread improvers.

Historically, yeast leavened baked products such as bread, rolls, buns, and the like have been prepared commercially by two distinct methods. The older procedure termed the "conventional" method is a single or two step batch procedure. In this procedure, given quantities of dough forming ingredients are mixed in single batches for form doughs. The doughs are then divided into discrete loaves and placed into pans for baking. The loaves are then baked by progressively moving these pans through conventional baking ovens. A more recent innovation in the art of commercial bread making is the introduction of continuous breadmaking processes. These continuous processes are more adaptable to modern automated production techniques and have come to be employed quite widely in the breadmaking industry.

As these continuous breadmaking processes have evolved, the complete bread dough is produced in a three step process. The first step is termed the "brew or broth" stage and consists of preparing a mixture of water, sugar, yeast, salt, yeast food, oxidants and milk solids. Some flour may also be added to the brew stage. The brew is then fermented for a period of time sufficient to produce the desired yeast activity. This initial stage is followed by two mixing steps (i.e., a preliminary mixing step and then a final very high speed mixing step).

In the preliminary mixing step, the remainder of the flour and the shortening are combined with the fermented brew and the mixture is subjected to a mild mixing action to produce a uniform mixture in which the solid ingredients are brought into intimate contact with the liquid phase of the mixture, but insufficient to completely develop a dough. The addition of any other dry ingredients in this preliminary mixing step would require additional capital expenditure for special feeder equipment which is not usually employed in present day continuous breadmaking processes. Almost all of the continuous bread processors have been unwilling to bear this added cost and to contend with the maintenance, inaccuracy, and unreliability which are inherent in the special metering equipment needed for addition of minor dry ingredients at the preliminary mixing step.

After the preliminary mix step, the resulting preliminary dough mixture is subjected to a final high speed mixing step. This high speed mixing is carried out in a closed chamber under pressure. Therefore, no additional ingredients can be added as a practical matter in this step. It is in this final mixing step that the dough is completely developed to its final characteristics and consistency. At this point of the process, it would be highly advantageous to have bread improvers such as calcium peroxide activated. Calcium peroxide acts to produce a stronger, drier dough and, consequently, an improved bread product having finer grain and texture. Calcium peroxide also has the well known effect of increasing dough absorption, thereby, increasing dough yield.

However, as set forth above, addition of these bread improvers in the preliminary and final mixing steps is not generally practical either from a commercial or a physical standpoint under existing conditions in the continuous breadmaking industry. Therefore, it has been a continuing problem to incorporate bread improvers such as calcium peroxide and the like in the continuous bread process in such a manner that they will not be dissipated before arriving at the final mixing step. For these bread improver ingredients to be of value, they must be present and active in this final mixing step. Consequently, heretofore, the continuous bread processors have been forced to forego the substantial benefits of such bread improvers as calcium peroxide in continuous processes unless they were willing to install the troublesome and costly special equipment which would enable them to add the aforementioned dry ingredients in the preliminary mixing step.

In an attempt to solve this problem, it has been proposed previously to employ a coating on these bread improvers to protect them from reacting before they reach the high speed mixing step. However, the previously suggested coating materials were water emulsifiable. Therefore, they could not successfully be added in the initial brew step since the coating would disperse in the aqueous medium, thus releasing the active agent before reaching the final mixing step. Consequently, these proposed coated bread improvers had to be added at the premix step rather than in the initial brew. As discussed above, this procedure has been shown to be impractical from a commercial standpoint under the procedures presently employed in continuous bread manufacture. As normally practiced at the present time, the minor dry ingredients must be added in the first step of a continuous process, no latitude is normally provided for incorporating dry ingredients other than flour at a subsequent stage.

Therefore, it would be highly advantageous and commercially important to provide new and improved coated bread improvers which can be added to the initial brew and which will not dissipate until the final mixing step at which time the bread improver is released to act in the development of the dough and, consequently, to improve the quality of the baked bread product.

Additionally, the previously proposed protective coating materials are relatively expensive. Thus, it would be an economical and commercial advantage to provide coated bread improvers which would provide the above described features and which would be cheaper to produce.

Therefore, it is an object of the present invention to provide new and improved coated bread improvers which can be produced and used more economically in continuous bread making operations.

Another object is to provide coated bread improvers for use in continuous breadmaking processes which are added to the initial brew and remain intact in major proportion until release in the final mixing stage.

A further object is to provide new and improved continuous breadmaking processes for preparing yeast leavened bread products such as yeast leavened bread, rolls, buns, and the like.

A still further object is to provide new and improved continuous breadmaking processes wherein coated bread improvers are introduced into the initial brew stage and a major portion of the bread improver is still available to act in the final high speed mixing step.

Additional objects, if not specifically set forth herein will be readily apparent to those skilled in the art from the following detailed description of the invention.

Generally, the products of the present invention comprise particulate bread improvers coated with edible, water insoluble protective materials which are heat dispersible at a temperature of from about 90° F. to about 120° F. These bread improver products can be added to the initial brew or broth in a continuous breadmaking process. The protective coating will effectively insulate the bread improver from premature activation or dissipation until the final high speed mixing step. However, in the final mix step, the mechanical working of the dough causes the temperature of the dough mixture to rise to a point at which the coating material melts and the bread improver is thermally released to act in promoting the development of the final dough.

More specifically, we have found that the objects of the present invention can be achieved by employing solid fat or lipid materials having melting points of at least about 90° F. to coat or envelop the bread improvers and to act as the protective shield therefor. Either saturated or unsaturated solid edible triglyceride fats having melting points in the range of about 90° F. to 120° F. can suitably be utilized for this protective coating or encasing. However, in a preferred embodiment of this invention a saturated hard triglyceride fat with a melting point of from about 90° F. to about 120° F. is employed, and in a most preferred embodiment the melting point would be above about 100° F.

In accordance with our invention, we have found that the protective material can be applied as a continuous coating on the entire surface of the individual bread improver particles by a simple procedure. In this procedure, the solid fat or lipid material is first melted. A desired amount of this melted fat is then poured with stirring into a vessel containing the desired particulate bread improver. The resultant slurry is solidified by cooling. This solidified mass is then ground or otherwise reduced to a desired particle size by any convenient procedure.

This method for preparing the coated products of this invention has been demonstrated to provide solid, substantially uniform coated bread improver particles. These coated particles are suitable for incorporation into the brew or broth of yeast leavened dough products such as yeast leavened bread, rolls, buns and the like. The amount of coated bread improver to be added to the brew or broth is determined according to the amount required in the recipe or formula for the particular bread product to be produced.

It has been found that when these coated bread improvers are added to the brew or broth, they remain intact and a major portion of the bread improver is available for release in the final mixing step. In the final mixing step, the mechanical working of the dough causes the temperature of the mixture to rise to a sufficient degree to melt the fat coating. Thus, the bread improver agent is thermally released in this step and acts to improve the final dough and, consequently, the final bread product. At no stage prior to the final mixing step is the temperature of the mixture sufficiently high to achieve this complete thermal release of the bread improver. Therefore, the major portion of the added bread improver is available for activity in the final mix step.

Additionally, it has been determined that, in some cases, the presence of salts in the brew formulation has a salutary effect on the stability of the coated bread improvers of the present invention. In this regard, it should be noted that it is standard practice to incorporate yeast foods, which are composed primarily of salts such as bromates, chlorides, sulfates and the like, into the "brew" in a continuous breadmaking process. Accordingly, the salts which provide this added effectiveness of the present coatings are normally present in the bread formulation and need not be added as a separate additive agent.

As described, this invention is applicable to a wide variety of bread improvers. However, this inventive concept is particularly applicable to inorganic bread improver compounds such as calcium peroxide, the persulfates of calcium, potassium, sodium and ammonium, potassium bromate, potassium iodate and sodium thiosulfate and the like.

The following examples are set forth for purposes of illustration only and are not intended to be construed as being limitative in any respect.

EXAMPLE I

This example illustrates the preparation of a coated bread improver.

One hundred parts by weight of Paramount 98, an edible hard triglyceride fat butter product of Durkee Famous Foods, Cleveland, Ohio, having a sharp melting point between 98° F. and 100° F., was heated to 120° F. The resulting melted lipid was then poured with stirring into an equal weight of finely particulate, food grade calcium peroxide in a small Hobart Mixer. A slurry was thus obtained. This slurry was then poured onto a pre-cooled cookie sheet and the slurry was cooled further to 0° F. to produce a solidified mass. The solid product was ground at 0° F. using short grinding times and chilled Waring blendors. This ground, coated calcium peroxide bread improver product was then sieved to the desired mesh sizes and dispersed in a ratio of 1 part to 50 parts (by weight) of a carrier agent including 88% flour and 12% salts (i.e., sodium chloride dicalcium phosphate and diammonium phosphate).

The protection afforded the peroxide by the fat coating was determined by continuously stirring coated and uncoated peroxide compositions in a simulated brew at a temperature of 85–87° F. and a pH of 4.3. Aliquots of brew were withdrawn periodically and the residual peroxide activity was determined. The results of these tests showed that the coated bread improvers of the present invention retained substantially greater peroxide activity than the uncoated samples.

EXAMPLE II

This example illustrates the preparation of commercial, open top white bread by a standard continuous bread making process employing a coated bread improver of the present invention.

The bread samples were prepared in a commercial scale continuous bread making plant employing a conventional three step process for producing the bread dough. A W&T Do Maker 36 continuous mix unit was utilized.

The initial broths or brews for producing the bread samples were prepared by adding all of the conventional ingredients (including sugar, salt, yeast food, oxidants, and milk solids), except the yeast and the flour, into a blending tank while water was being run into the tank. These ingredients were blended for about 10 minutes, then the yeast and the flour (50% of the flour in the formula) were added. Thereafter, the broth was pumped to a hold tank, and the broth was fermented for 1½ hours. The broth was then pumped to a transfer tank, where it was held for an additional 30 minutes.

In the preparation of the control bread loaves (hereinafter termed, A, B, and C), no bread improver agent was added to the dough mixture. The other test sample bread loaves (hereinafter termed D, E, and F), were prepared with the addition of 0.5% (based on the total weight of the flour employed in the dough) coated calcium peroxide bread improver formulation prepared in accordance with the method of Example I. This coated bread improver having an amount of calcium peroxide equivalent to about 0.005% of the total flour weight was added to each of samples, D, E, and F, with the basic dough ingredients at the initial blending stage of the broad step.

After the initial broth step, the sample doughs were pumped to a Do Maker premixer and the doughs were subjected to a conventional mild, uniform mixing action. The preliminary doughs thus prepared were then conveyed into a standard closed chamber, high speed mixer wherein the doughs were subjected to rigorous mechanical working. The resulting batter-like final doughs were then introduced into individual open top baking pans and the doughs were proofed and baked in a continuous oven by conventional procedures.

The resulting white bread products were then tested to determine the quality of the loaves. The results of this testing are summarized in the following table:

| Sample loaves | A | B | C | D | E | F |
|---|---|---|---|---|---|---|
| Percent flour in brew | 50 | 50 | 50 | 50 | 50 | 50 |
| Percent coated calcium peroxide bread improver formulation | | | | *0.5 | *0.5 | *0.5 |
| Developer, r.p.m | 240 | 250 | 260 | 240 | 248 | 260 |
| Proof time, min | 56 | 56 | 60 | 55 | 59 | 55 |
| Bread quality: | | | | | | |
| External: | | | | | | |
| Volume (0–10 scale) | 9.5 | 9.5 | 9.5 | 9.5 | 9.5 | 9.5 |
| Crust color (0–3 scale) | 3.0 | 3.0 | 3.0 | 3.0 | 3.0 | 3.0 |
| Symmetry (0–3 scale) | 2.0 | 2.0 | 1.5 | 3.0 | 3.0 | 3.0 |
| Evenness of bake (0–3 scale) | 3.0 | 3.0 | 3.0 | 3.0 | 3.0 | 2.5 |
| Crust character (0–3 scale) | 3.0 | 3.0 | 3.0 | 3.0 | 3.0 | 3.0 |
| Bread and shred (0–3 scale) | 1.5 | 1.5 | 1.5 | 2.5 | 2.5 | 2.5 |
| Total external | 22.0 | 22.0 | 21.5 | 24.0 | 24.0 | 23.5 |
| Internal: | | | | | | |
| Grain (0–19 scale) | 16.0 | 17.5 | 16.0 | 17.0 | 18.0 | 17.0 |
| Crumb color (0–12 scale) | 8.0 | 8.0 | 8.0 | 9.5 | 9.5 | 9.5 |
| Aroma (0–10 scale) | 8.0 | 8.0 | 8.0 | 9.0 | 9.0 | 9.0 |
| Taste (0–10 scale) | 9.0 | 9.0 | 9.0 | 9.0 | 9.0 | 9.0 |
| Chewability (0–12 scale) | 11.0 | 11.0 | 11.0 | 11.0 | 11.0 | 11.0 |
| Texture (0–12 scale) | 11.0 | 11.0 | 11.0 | 10.5 | 10.5 | 10.5 |
| Total internal | 63.0 | 64.5 | 63.0 | 66.0 | 67.0 | 66.0 |
| Total | 85.0 | 86.5 | 84.5 | 90.0 | 91.0 | 89.5 |

*Equivalent to about 0.005% calcium peroxide (based on the total weight of the flour).

The above tabulated results indicate the substantial improvement in bread quality obtained when the coated bread improver of the present invention was incorporated into the dough at the initial broth or brew stage. For example, it should be noted that the bread loaves prepared with the coated bread improver showed stronger sidewalls, improved break and shred, better loaf symmetry, improved grain and improved aroma.

It was also shown in this testing that the new and improved coated bread improvers of this invention can be easily added to the brew or broth and do not affect fermentation or cause foaming in the broth. Processing conditions were normal as compared with the control dough containing no additive. Also, it was found that the absorption of the doughs containing the coated bread improvers was substantially increased.

EXAMPLE III

This example illustrates the preparation of continuous mix commercial white bread employing a coated bread improver of the present invention.

The bread samples were prepared in a commercial scale continuous bread making plant employing a conventional three step process for producing the bread dough. A Baker Do Maker Continuous Mix Unit was utilized.

The basic formula for the broth, which contains no flour, and the procedure for preparing the broth are tabulated below:

| | Amount | Percent* | Procedure |
|---|---|---|---|
| Water | 1,082 lbs. 0 oz. | 65.60 | 1. Add ingredients to water in blending tank and mix 5 min. |
| Liquid sugar | 179 lbs. 10 oz. | 10.89 | |
| Salt | 40 lbs. 6 oz. | 2.45 | |
| Non-fat dry milk | 16 lbs. 13 oz. | 1.00 | |
| Monocalcium phosphate | 4 lbs. 4 oz. | 0.26 | |
| Yeast food | 8 lbs. 7 oz. | 0.50 | |
| Mold inhibitor | 2 lbs. 11 oz. | 0.16 | |
| Soy flour | 2 lbs. 15 oz. | 0.18 | |
| Compressed yeast | 43 lbs. 12 oz. | 2.65 | 1. Add to blending tank and ferment ½ hour. 2. Transfer to fermentation tank and ferment 1½ hours. Transfer to hold tank. |
| Vitamin-mineral tablets | 17 tablets | | |
| Potassium bromate | 72.7 p.p.m.** | | 1. Add to broth about 15 minutes before transfer to hold tank. |
| Azodicarbonamide | 18 p.p.m.** | | |

*Basis weight of flour incorporated in the premixing step.
**Flour weight basis.
NOTE.—Broth set at 88° F. and maintained at this temperature.

In the preparation of control bread loaves, no bread improver agent was added to the dough mixture. The other test sample bread loaves were prepared with the addition of a coated calcium peroxide bread improver formulation prepared in accordance with the method of Example I. This coated bread improver was incorporated into the broth with the dry ingredients at the first blending stage.

The operating conditions for preparing the control and the sample loaves is set forth in the following table:

OPERATING CONDITIONS

| | Control bread | Sample bread |
|---|---|---|
| Coated calcium peroxide bread improver formulation (flour weight basis) percent | | *0.50 |
| Water increase, pounds/broth | | 50 |
| Broth temp., end of fermentation, degrees F | 89 | 86 |
| Mixer operating conditions: | | |
| Total flour, lbs | 1,650 | 1,650 |
| Premix temp., ° F | 87 | 87 |
| Broth rate | 36 | 37 |
| Premix viscosity | −0.2 | −0.2 |
| Developer motor current | 109 | 112 |
| Developer speed, r.p.m | 237 | 237 |
| Developer motor power | 22–24 | 23½ |
| Dough temp., ° F | 108 | 108 |
| Proof time, min | 63–65 | 63–64 |
| Proof height, inches above pan | 4/8+ | 4/8 |
| Bake time, min | 17 | 17 |

*Equivalent to about 0.005% calcium peroxide (based on the total weight of the flour).

The resulting bread loaves were subjected to testing in order to ascertain the quality of the bread produced. The results of this testing indicated that the bread containing the coated bread improver of the present invention was substantially superior to the bread loaves prepared without the bread improver.

We claim:

1. A continuous breadmaking process comprising preparing a yeast brew having incorporated therein a particulate bread improver coated with an edible, water insoluble, solid triglyceride fat, said fat having a melting point in the range of from about 90° F. to about 120° F. and acting as a protective shield for said bread improver, fermenting said yeast brew, subjecting said fermented yeast brew to a preliminary mixing to produce a preliminary dough mixture and subjecting said preliminary dough mixture to a final high speed mixing to completely develop the dough, said fat coating insulating said bread improver from dissipation until said finally high speed mixing at which time said bread improver is thermally released to act in promoting the development of said final dough.

2. The process of claim 1 wherein said bread improver is calcium peroxide.

3. The process of claim 2 wherein said triglyceride fat is a saturated hard fat.

4. In a continuous breadmaking process wherein a bread dough is produced in a three step process by preparing a fermented yeast brew, subjecting said fermented yeast brew to a preliminary mixing step to produce a preliminary dough mixture, and subjecting said preliminary dough mixture to a final high speed mixing step to produce a completely developed dough, the improvement comprising incorporating a particulate inorganic bread improver into the initial brew, said bread improver having a protective coating material thereon, said protective coating material comprising an edible, water insoluble, solid triglyceride fat having a melting point in the range of from about 90° F. to about 120° F.

5. The process of claim 4 wherein said bread improver is calcium peroxide.

6. The process of claim 5 wherein said triglyceride fat is a saturated hard fat.

7. The process of claim 4 wherein said yeast brew contains a salt.

References Cited
UNITED STATES PATENTS 2,971,845  2/1961  Ferrari _____ 99—91 X
2,997,394  8/1961  Melnick et al. _____ 99—91 X RAYMOND N. JONES, Primary Examiner J. R. HOFFMAN, Assistant Examiner U.S. Cl. X.R.

99—118 P